June 23, 1925.

B. S. SNOWDEN

RAILWAY HAND CAR

Filed Jan. 6, 1925

WITNESSES
Geo. W. Naylor
Hugh H. Ott

INVENTOR
Byron S. Snowden
BY Munn & Co.
ATTORNEYS

June 23, 1925.
B. S. SNOWDEN
RAILWAY HAND CAR
Filed Jan. 6, 1925
1,543,624
2 Sheets-Sheet 2
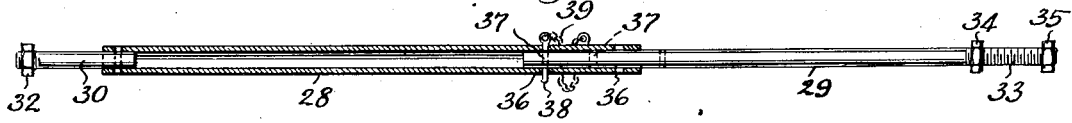
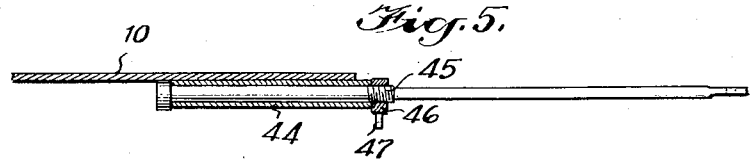
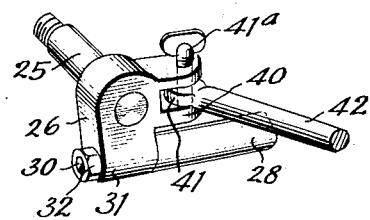
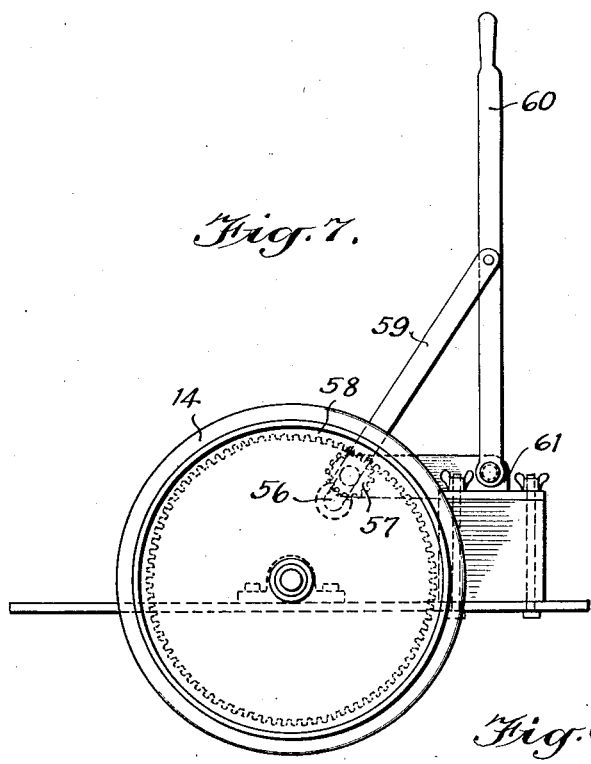
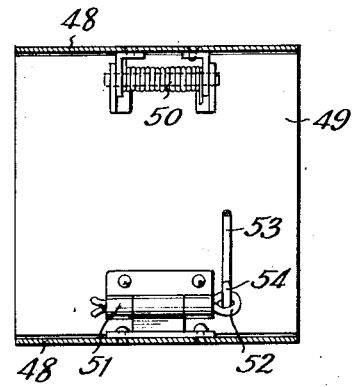
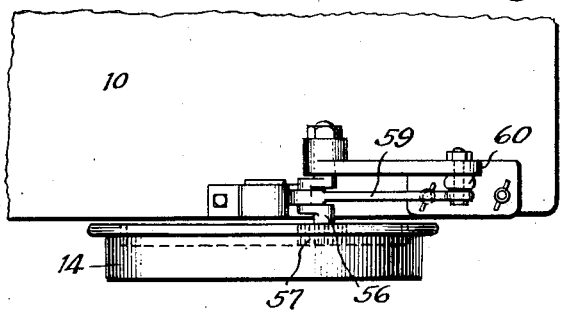
INVENTOR
*Bryon S. Snowden*
BY
ATTORNEYS Patented June 23, 1925.

1,543,624

UNITED STATES PATENT OFFICE.

BYRON S. SNOWDEN, OF ALBANY, NEW YORK.

RAILWAY HAND CAR.

Application filed January 6, 1925. Serial No. 837.

*To all whom it may concern:*

Be it known that I, BYRON S. SNOWDEN, a citizen of the United States of America, and resident of Albany, in the county of Albany and State of New York, have invented a new and Improved Railway Hand Car, of which the following is a full, clear, and exact description.

This invention pertains to railway hand cars and aims for one of its main objects to provide a light weight, collapsible emergency hand car to be carried as a part of the regular equipment of a train, to afford a convenient means of travel by which one of the crew or passengers may rapidly reach the nearest station in an emergency.

One of the outstanding features of the present invention resides in the collapsibility of the car whereby the same when not in use, may be reduced to a size so as to be capable of storage in the smallest practical space such as a container therefor and which may be readily set up for use when the need for the same arises.

The invention furthermore contemplates a collapsible emergency hand car either of the manually operated or power driven type, the body of which carries a pair of fixed wheels for engagement with one rail, a pair of detachable supporting and guide wheels for engaging the opposite rail and collapsible means for connecting the wheels with each other and for detachably connecting said wheels with the body or platform of the car.

As a still further object the invention aims to provide an improved hand car of the character set forth which is extremely simple in its construction and mode of operation, inexpensive to manufacture and which is highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Fig. 3 is a detail longitudinal sectional view of the collapsible reach bar for the supporting and guide wheels.

Fig. 4 is a fragmentary perspective view of one of the spindle brackets associated with the end of the reach bar and carrying the supporting and guide wheel spindle.

Fig. 5 is a fragmentary longitudinal sectional view of the telescopic connecting brace rods between the platform and the reach bar.

Fig. 6 is a sectional view through the portion of the container wall which constitutes a seat for the hand car when set up.

Fig. 7 is a fragmentary detail view of the manual means for operating the car.

Fig. 8 is a fragmentary plan view thereof.

Figure 1:
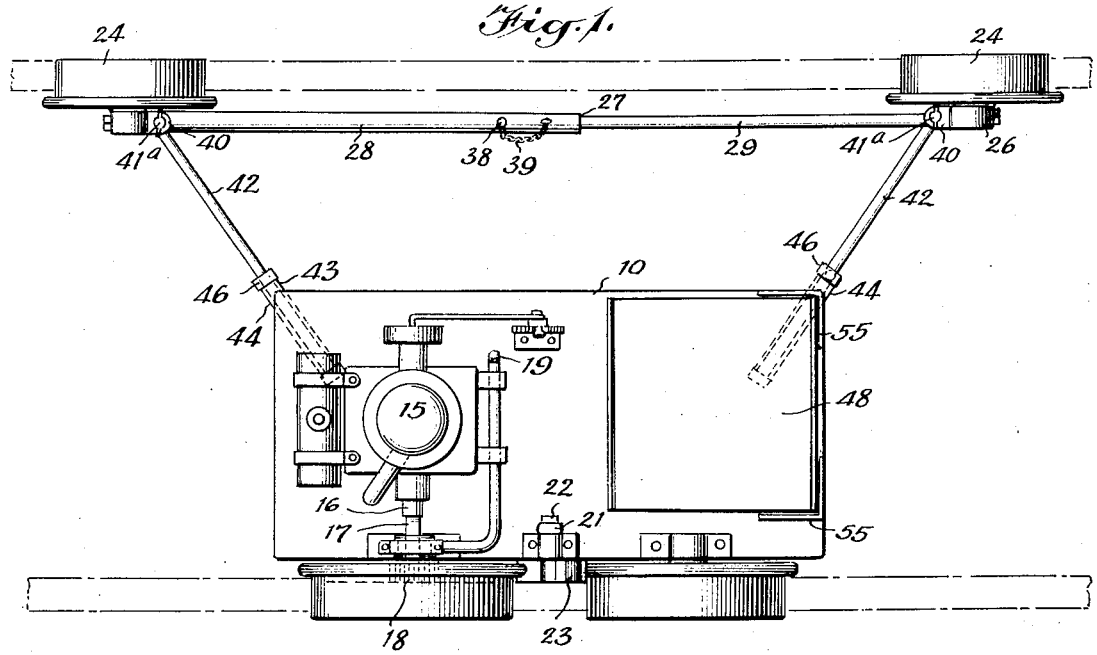
Figure 1 is a plan view of a hand car constructed in accordance with the invention illustrating the same set up and ready for use.
Figure 2:
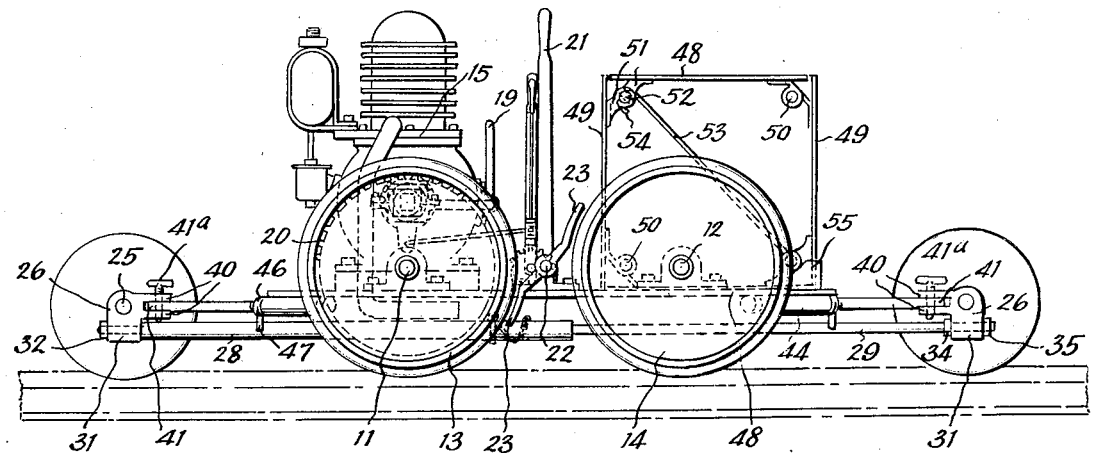
Fig. 2 is a side view thereof.

Referring to the drawings by character of reference 10 designates the body or platform of the hand car which is provided at one side with fixed spindles 11 and 12 upon which the fixed drive and supporting wheel 13 and the fixed supporting wheel 14 are respectively journaled, said wheels being of the usual flange type for engagement with a railway rail. The platform also supports in the preferred embodiment an internal combustion motor 15 which is provided with a motor shaft 16 having a squared portion 17 upon which a drive gear 18 is mounted for turning movement therewith and for axially shifting movement by means of a gear shifting lever 19. The drive gear 18 is moved into and out of engagement with a ring gear 20 on the drive wheels 13 by means of the gear shift lever 19 so that the motor may be readily coupled to or uncoupled from the drive wheels 13. The platform further supports a brake lever 21 mounted on a shaft 22 which is provided with radially projecting brake shoes 23 for engaging the rims of the wheels 13 and 14 simultaneously when the brake is applied. In order to provide means for guiding and supporting the opposite side of the platform from the opposite rail, a pair of supporting and guide trailer wheels 24 are provided which are journaled on spindles 25 projecting laterally from the spindle brackets 26 which are carried by the opposite ends of a collapsible reach bar 27. The reach bar 27 includes telescopic sections 28 and 29 the outer end of the former having a reduced threaded stem 30 which extends through the sleeve portion 31 in the spindle bracket and has threaded thereon a retaining nut 32. The section 29 is provided with a threaded outer end 33 which also extends through the sleeve 31 in the opposite spindle bracket 26 and has threaded thereon nuts 34 and 35 which clamp the opposite ends of the sleeve. The inner end of the section 28 which is tubular is provided with a plurality of diametrically alined openings 36 and the inner end of the section 29 which is preferably solid is provided with a plurality of perforations 37. A lock pin 38 is designed to pass through the alined perforations 36 and 37 and is preferably attached to the section 28 by a flexible element such as a chain 39. Each spindle bracket 26 is provided with a pair of vertically spaced apertured ears 40 for receiving the flattened apertured end 41 of the outer telescopic section 42 of a connecting brace rod 43 which brace rod is provided with a fixed inner tubular section 44 carried by the side of the car body or platform 10. The connecting brace rods 43 are preferably disposed at an angle so that the wheel base of the trailer wheels 24 is considerably greater than the wheel base of the drive and supporting wheels 13 and 14. In order to maintain the sections 42 of the brace rods distended when the car is set up for use, the intermediate portion of each brace rod section 42 is provided with a threaded portion 45 with which a nut 46 threadedly engages and coacts with the outer end of the inner connecting brace rod sections 44. The nuts 46 are provided with a weighted handle portion 47 which gravitationally acts to prevent accidental retrograde movement of the nuts and consequent accidental telescoping of the sections. In order to provide a seat for the car body or platform the container which houses the hand car when collapsed is provided with an end wall made up of two parts having hingedly connected sections 48 and 49 said sections being hingedly connected by spring hinges 50 which normally tend to dispose the sections in alinement but which renders the same capable of being disposed in angular relation. Each of the sections 48 and 49 are provided adjacent their free ends with knuckles 51 through which retaining pins 52 are inserted. A connecting rod 53 having hooked terminals 54 is engaged by the retaining pins 52 to hold the container wall sections in substantially a square formation to be mounted upon the platform between the angle elements 55 to form a seat.

It is of course to be understood that in lieu of a power driven hand car a manually operated means may be employed such as illustrated in Figs. 7 and 8 in which a crank shaft 56 is provided having keyed thereto a driving gear 57 meshing with the ring gear 58 on the fixed supporting and drive wheel 14. A crank arm or pitman 59 connects with the crank portion of the crank shaft and with an operating lever 60 which is fulcrumed to a suitable bearing 61.

When the car is to be set up for use the telescopic sections 28 and 29 of the reach bar 27 are distended and the lock pin 38 is inserted through the alined apertures 36 and 37 at the inner ends of said sections. The connecting brace rods 43 are distended and locked in place by the gravity nuts 46, the outer flattened apertured ends 41 of the outer sections 42 of the connecting brace rods are inserted between the vertically spaced apertured ears 40 of the spindle bracket 26 and a set screw 41$^a$ is extended through said ears and flattened apertured portions. When the car is to be collapsed the set screws 41$^a$ are removed, the nuts 46 are unscrewed to permit the telescoping and collapsing of the outer sections 42 to dispose the same substantially within the area or confines of the car body or platform 10. The lock pin 38 is withdrawn and the sections 28 and 29 are telescoped to collapse the same. The car body together with the reach bar and trailer wheels 24 are then packed within a suitable container therefor and it is of course understood that the container end wall sections forming the seat are readjusted to complete the container.

From the foregoing it will thus be seen that an extremely simple, light weight, durable and inexpensive form of collapsible emergency hand car has been provided which may be readily set up or conveniently reduced in size for storage.

I claim:

1. A collapsible emergency railway hand car including a platform having rail engaging supporting means at one side thereof for engaging one rail, a pair of flanged wheels for engaging the opposite rail, telescopic means connecting said wheels and telescopic means carried by the platform provided with detachable means of connection with the connecting means between the wheels.

2. A collapsible emergency railway hand car including a platform having rail engaging supporting means at one side thereof for engaging one rail, a pair of flanged wheels for engaging the opposite rail, telescopic means connecting said wheels and telescopic means carried by the platform provided with detachable means of connection with the connecting means between the wheels, and means for respectively maintaining said telescopic connecting means in distended relation.

3. A collapsible emergency railway hand car including a platform having permanently connected rail engaging platform supporting means at one side thereof for engaging one rail, a pair of removable supporting wheels for engaging the opposite rail, said wheels having telescopic means of connection therebetween, and telescopic means carried by the platform having detachable connection with the connecting means between said wheels.

4. In a collapsible emergency railway hand car including a platform, a pair of permanent supporting wheels journaled at one side thereof for engaging one rail, means on the platform for rotating one of said wheels to drive the car, a pair of removable supporting wheels for engaging the opposite rail and supporting the opposite side of the car platform therefrom and a collapsible connecting and supporting framework for said latter wheels comprising a reach bar including telescopic sections connected with the wheel journals and connecting brace bars including telescopic sections carried by the under side of the platform and detachable means of connection between the outer end of the outer sections of the connecting brace bars and the reach bar.

5. In a collapsible emergency hand car including a platform, a pair of permanent supporting wheels journaled at one side thereof for engaging one rail, means on the platform for rotating one of said wheels to drive the car, a pair of removable supporting wheels for engaging the opposite rail and supporting the opposite side of the car platform therefrom and a collapsible connecting and supporting framework for said latter wheels comprising a reach bar including telescopic sections connected with the wheel journals and connecting brace bars including telescopic sections carried by the under side of the platform and detachable means of connection between the outer end of the outer sections of the connecting brace bars and the reach bar and means for respectively maintaining the telescopic sections of the reach bar and the telescopic sections of the brace bars in distended relation.

6. In a collapsible emergency railway hand car including a platform, a pair of permanent supporting wheels journaled at one side thereof for engaging one rail, means on the platform for rotating one of said wheels to drive the car, a pair of removable supporting wheels for engaging the opposite rail and supporting the opposite side of the car platform therefrom and a collapsible connecting and supporting framework for said latter wheels comprising a reach bar including telescopic sections connected with the wheel journals and connecting brace bars including telescopic sections carried by the under side of the platform and detachable means of connection between the outer end of the outer sections of the connecting brace bars and the reach bar, and means for respectively maintaining the telescopic sections of the brace bars in distended relation, the said former means comprising apertured portions in the inner ends of the telescopic sections and a pin insertable therethrough and the said latter means comprising a threaded portion medially of each outer section of the brace bar and a binding nut engageable therewith.

7. In a collapsible emergency hand car including a platform, a pair of permanent supporting wheels journaled at one side thereof for engaging one rail, means on the platform for rotating one of said wheels to drive the car, a pair of removable supporting wheels for engaging the opposite rail and supporting the opposite side of the car platform therefrom and a collapsible connecting and supporting framework for said latter wheels comprising a reach bar including telescopic sections connected with the wheel journals and connecting brace bars including telescopic sections carried by the under side of the platform and detachable means of connection between the outer end of the outer sections of the connecting brace bars and the reach bar, and means for respectively maintaining the telescopic sections of the reach bar and the telescopic sections of the brace bars in distended relation, the said former means comprising apertured portions in the inner ends of the telescopic sections and a pin insertable therethrough and the said latter means comprising a threaded portion medially of each outer section of the brace bar and a binding nut engageable therewith, said binding nut having a weighted handle for gravitationally maintaining the nuts against retrograde movement.

8. In a collapsible emergency railway hand car, the combination with a car platform having permanent supporting wheels journaled to one side thereof for engagement with one rail of a pair of detachable supporting wheels for engaging the opposite rail and means for detachably connecting said wheels with each other and with the car platform comprising a spindle bracket upon which each wheel is journaled, a reach bar including a pair of telescopic sections the outer ends of which are respectively connected to one of the spindle brackets, engageable and detachable means of connection between the inner ends of said sections, a pair of telescopic connecting brace rods having stationary sections secured to the car platform and movable sections projectable therefrom, said latter sections having detachable means of connection with the spindle brackets and means for maintaining said latter sections in distended position when the car is set up for use.

BYRON S. SNOWDEN.